Patented Oct. 12, 1948

2,451,327

UNITED STATES PATENT OFFICE 2,451,327

REMOVAL OF ACETYLENE FROM DIOLEFIN-CONTAINING MIXTURES

Egi V. Fasce, Baton Rouge, La., and William H. Wood, Warren, Pa.; Sarah Thomas Fasce, attorney-in-fact for said Egi V. Fasce, assignors to Standard Oil Development Company, a corporation of Delaware No Drawing. Application November 30, 1944, Serial No. 565,839½

6 Claims. (Cl. 260—681.5)

This invention relates to improvements for the separation of acetylenes from hydrocarbon mixtures, and particularly to improvements for the separation of acetylenes from hydrocarbon mixtures containing diolefins and acetylenes.

The general method used for the separation of diolefins, particularly butadiene, from hydrocarbon mixtures, such as those obtained by thermal cracking of a petroleum oil and by catalytic dehydrogenation of butenes and butanes, containing a high percentage of butadiene together with other hydrocarbons such as acetylenes, is to contact the hydrocarbon mixture with ammoniacal cuprous acetate solution or other cuprous salt solution in order to obtain as a product butadiene of extremely high purity, but it has also been found that unsaturated hydrocarbons other than butadiene are also absorbed by the solutions when contacted therewith. Since the copper solution has a high dissolving power for acetylenic compounds, such as methyl acetylene, ethyl acetylene, and vinyl acetylene, these hydrocarbons are undesirably removed along with the diolefins. For instance, in the case of a hydrocarbon gas containing 0.1% of any of the acetylenes designated, a copper solution brought to an equilibrium therewith at 100° F. contains about 0.19 mol of dissolved acetylenes per liter of solution or about 0.8% by weight. Higher concentrations of acetylene in the gas phase result in higher concentrations of acetylene dissolved by the copper solutions. It is not desirable to increase the dissolved acetylene content of these solutions to too high a level as under such conditions polymerization and precipitation of solid copper acetylides occur. The presence of the acetylides in an operating system is undesirable since they tend to stop the flow of liquid and constitute a hazard due to their tendency to decompose with some violence. This explosive decomposition is greatly increased in the dry state and is always, therefore, a potential hazard. The presence of the polymers is particularly undesirable since they are excellent emulsifying and foaming agents and cause plugging of the various pieces of equipment, particularly the absorption, stripping and desorption towers. Consequently, it is desirable to first remove the acetylenes or at least reduce the concentration in the feed mixture before contacting with the copper solution.

According to this invention it has been found that the acetylenes may be selectively removed from the hydrocarbon mixture containing butadiene and acetylene by contacting the mixture with a catalyst comprising a metal of the iron group, deposited upon certain types of carriers.

The improved catalysts consist essentially of metallic nickel, cobalt or iron deposited upon highly active cracking catalysts such as a commercial sulfuric acid treated bentonite, aluminum silicate, synthetic impregnated or plural gels of silica and alumina, silica and magnesia, or silica and alumina and magnesia, or acid-treated clays of the bentonitic and montmorillonitic type. The quantity of metal in the catalyst may be between 1 and 15% by weight and is preferably between 4 and 10% by weight. The active carrier may or may not first be treated with fluorine, hydrofluoric acid, fluosilicic acid or other fluorine compounds.

It is highly important, according to this invention, that the active carrier be one which is in itself a good cracking catalyst. The cracking activity of a catalyst is determined by passing a 33.8° A. P. I. East Texas gas oil over it for two hours at a rate of 0.6 volume of oil per volume of catalyst per hour at 850° F. and substantially atmospheric pressure. The liquid products are subjected to an Engler distillation up to 400° F. and the % distillation and loss up to this temperature is recorded as the % D+L. A good cracking catalyst is one which gives a D+L yield greater than 25%. The active carriers to be used according to this invention, therefore, are those which give D+L yields greater than 25%. For example such carriers as kieselguhr, pumice and the like are not suitable for this invention since they give D+L yields of only 8 to 12%.

The catalysts may be prepared by impregnating the active carrier with a solution of a soluble salt of the metal, preferably the nitrate, then extruding or otherwise shaping the plastic mass so obtained and drying the extruded mass in a steam oven at about 300° to 400° F. If the nitrate has been used for impregnation, some nitric acid as well as oxides of nitrogen will be evolved in this drying operation. Thereafter the dried mass is heated in a furnace to a temperature between 500° and 800° F. for a period of 10 to 12 hours or more in order to decompose the remaining nitrates. This results in a catalyst comprising the metal oxide deposited on the carrier. The metal oxide is then reduced to the metal by circulating hydrogen over the catalyst while the temperature is gradually raised to between about 600° and 900° F. This reduction treatment may take place in the reaction vessel in which the catalyst is to be used and immediately following complete reduction the hydrogenation may be begun by introducing the hydorcarbon feed. In some cases it is found that the activity of these catalysts may be increased still further by treating the metallic catalyst prepared in the manner just described with sulfur-containing gases, such as hydrogen sulfide, and then subsequently removing the sulfur by treatment with hydrogen.

The method of preparing the improved catalysts will be better understood from the following description of the preparation of a catalyst comprising about 7% metallic nickel on hydrofluoric acid-treated bentonite:

About 100 pounds of an acid-treated bentonite as obtained from the manufacturer is charged to a suitable mixing device, and about 100 pounds of a 10% hydrofluoric acid solution is added thereto. The clay and solution are thoroughly mixed for a period of about an hour. A thin slurry is formed which is continuously charged to the top of a suitable drying furnace. The inlet temperature of the furnace is maintained at about 350° F. and the outlet temperature at about 600° F. The dried hydrofluoric acid-treated clay so obtained will still contain about 20% of volatile matter. It is then ground to a powder of about 200 mesh size.

About 100 pounds of the ground, dried hydrofluoric acid-treated clay so obtained is charged to another mixing device which may be similar to the first one and about 4 gallons of a solution containing about 31 pounds of nickel nitrate (Ni(NO$_3$)$_2$.6H$_2$O) is added thereto. This quantity of nickel nitrate is equivalent to about 8 pounds of nickel oxide or about 6.3 pounds of metallic nickel. The clay and solution of nickel nitrate are thoroughly mixed for about 30 minutes and ordinarily a semi-plastic mass suitable for immediate extrusion will be obtained. If necessary, water may be added in sufficient amounts to make the mass suitable for extrusion. Too much water should not be added because then a drying operation is required before extrusion.

The plastic mass is extruded in any suitable means for this purpose and the extruded mass is dried in a steam oven for about 8 or 9 hours at a temperature of about 325° F. The dried catalyst is then heated in a furnace to a temperature between 550° and 750° F. for a period of 12 hours to remove the last traces of nitrates.

The nickel oxide catalyst so obtained is placed in a suitable pressure vessel adapted to withstand pressures of 3000 pounds per square inch or more and hydrogen, free from sulfur and other impurities, is circulated through it at a rate of about 1000 volumes of gas per volume of catalyst per hour. The temperature of the catalyst is raised at about 50° F. per hour to 325° F. and is maintained at this level for about 9 hours. The temperature is then raised further at about 30° F. per hour to 450° F. Thereafter it is raised at 20° F. per hour to 550° F. and at 10° F. per hour to about 600° F. or more and maintained at this level for about 24 hours. The catalyst is then ready for use.

The same general method of preparing the catalyst is applicable when a synthetic impregnated gel of silica and alumina is used as the base instead of an acid-treated bentonite. The synthetic impregnated gel may be prepared in a number of different ways which are known in the art, one convenient method being as follows: Equal portions of sodium silicate solution and acid are mixed in such concentrations as to form a clear, colloidal solution of silicic acid which upon standing sets into a firm hydrogel structure. The firm hydrogel after being permitted to set until syneresis is fully developed is broken into small lumps and thoroughly washed until substantially free of reaction impurities. The silica hydrogel so obtained is impregnated with a solution of an aluminum compound which can be decomposed or converted into aluminum oxide, for example aluminum nitrate or aluminum acetate. The impregnated hydrogel is dried and then slowly heated to a temperature of about 700° F. or somewhat higher to convert the aluminum salt to the oxide and to convert the hydrogel into a dry gel. The resulting product is a synthetic impregnated gel of silica and alumina and may be used as the base material for preparing catalysts according to the present invention.

In using these catalysts for the selective removal of acetylene in diolefin-containing hydrocarbon mixtures, the temperature of treatment may vary between 50° and 300° C., preferably 50° to 150° C. The feed rate in the liquid phase may be between about 0.05 and 20 volumes of liquid per volume of catalyst per hour, preferably between 0.5 and 5 volumes of liquid per volume of catalyst per hour, while the feed rate in the vapor phase may be 0.1 to 2 volumes per volume of catalyst per hour measured as liquid. Pressures may range from slightly below atmospheric to slightly above atmospheric. During the process acetylene polymers are formed and are adsorbed on the catalyst support. It is therefore necessary to periodically remove these polymers in order to maintain the activity of the catalyst. Such removal may be effected by stripping the catalyst with a suitable solvent which will disolve the polymers or the polymers may be removed by stripping with oxygen-free steam.

The following examples will further illustrate the invention but the invention is not to be restricted to the examples which are illustrative only:

*Example 1*

A hydrocarbon mixture containing butadiene and 636 parts per million of C$_4$ acetylenes was passed at a rate of 15 cc. per hour through a 3 ft. by 1 in. heat-resistant glass tube containing nickel on hydrofluoric acid-treated Super Filtrol catalyst in the form of pills at a temperature ranging from 75° to 90° C. This catalyst had been previously reduced with hydrogen. The exit gas from the second hour operation was collected and the product was shown to contain only 44 parts per million of acetylenes.

*Example 2*

A second run was made in the same manner as in Example 1, except that the liquid feed was increased to 60 cc. per hour. The product obtained contained 228 parts per million of acetylene, 99.6% of unsaturated hydrocarbons and 98.6% of butadiene.

From the above examples it is evident that the acetylenes were substantially completely removed from the butadiene-containing gases.

The nature and objects of the present invention having thus been set forth and specific examples of the same given, what is claimed as new and useful and desired to be secured by Letters Patent is:

1. A process for selective removal of acetylenes from a gaseous hydrocarbon fraction containing diolefins, which comprises passing said gaseous fraction in the absence of hydrogen at a temperature between 50° and 300° C. over a catalyst comprising an aluminum silicate selected from the group consisting of bentonite and montmorillonite and which has been previously treated with an acid selected from the group consisting of sulfuric acid, fluosilicic acid, and hydrofluoric acid whereby the acetylenes are selectively polymerized and withdrawing from the catalyst the diolefins substantially free of acetylenes.

2. A process as described in claim 1 in which said catalyst is a sulfuric acid-treated bentonite.

3. A process for selective removal of acetylenes from a gaseous hydrocarbon fraction containing diolefins which comprises passing said gaseous fraction in the absence of hydrogen at a temperature between 50° and 300° C. over a catalyst comprising an aluminum silicate selected from the group consisting of bentonite and montmorillonite and which has been previously treated with an acid selected from the group consisting of sulfuric acid, fluosilicic acid, and hydrofluoric acid whereby the acetylenes are selectively polymerized, withdrawing from the catalyst the diolefins substantially free of acetylenes and periodically removing the acetylene polymers formed on the catalyst to maintain the activity of the catalyst during further treatment of the gaseous fraction.

4. A process as described in claim 3 in which said acid-treated aluminum silicate is a sulfuric acid-treated bentonite.

5. Process according to claim 1 in which the catalyst consists of a minor amount of a group VIII metal and a major amount of said acid-treated aluminum silicate.

6. Process according to claim 5 in which the catalyst consists of 4 to 10% by weight of metallic nickel deposited on bentonite which has been successively treated with sulfuric acid and hydrofluoric acid.

EGI V. FASCE,
By Mrs. Sarah Thomas Fasce, Agent and Attorney in Fact.
WILLIAM H. WOOD.

REFERENCES CITED

The following references are of record in the file of this patent:

UNITED STATES PATENTS

| Number | Name | Date |
| --- | --- | --- |
| 2,145,387 | Berndt et al. | Jan. 31, 1939 |
| 2,320,127 | Hackmuth | May 25, 1943 |
| 2,358,879 | Redcay | Sept. 26, 1944 |
| 2,398,301 | Frevel | Apr. 9, 1946 |